United States Patent
Xu et al.

(10) Patent No.: US 10,104,577 B2
(45) Date of Patent: Oct. 16, 2018

(54) MBMS BEARER-BASED METHOD AND SYSTEM FOR REPORTING CONGESTION STATE IN CLUSTER COMMUNICATION AND STORAGE MEDIUM

(71) Applicant: ZTE Corporation, Shenzhen, Guangdong (CN)

(72) Inventors: Hui Xu, Shenzhen (CN); Hongjun Liu, Shenzhen (CN); Zijiang Ma, Shenzhen (CN); Yaying Wang, Shenzhen (CN); Chen Lu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/514,027

(22) PCT Filed: Feb. 11, 2015

(86) PCT No.: PCT/CN2015/072811
§ 371 (c)(1),
(2) Date: May 1, 2017

(87) PCT Pub. No.: WO2016/015465
PCT Pub. Date: Feb. 4, 2016

(65) Prior Publication Data
US 2017/0251398 A1 Aug. 31, 2017

(30) Foreign Application Priority Data
Jul. 31, 2014 (CN) .......................... 2014 1 0373211

(51) Int. Cl.
*H04W 28/02* (2009.01)
*H04W 4/06* (2009.01)
(Continued)

(52) U.S. Cl.
CPC ......... *H04W 28/0289* (2013.01); *H04W 4/06* (2013.01); *H04W 28/0247* (2013.01);
(Continued)

(58) Field of Classification Search
None
See application file for complete search history.

(56) References Cited

U.S. PATENT DOCUMENTS 9,843,963 B2 * 12/2017 Xiao ...................... H04W 28/08
2004/0152476 A1 * 8/2004 Kuwano ............... H04W 68/00
455/459

(Continued)

FOREIGN PATENT DOCUMENTS

CN 1859645 A 11/2006
CN 103428856 A 12/2013
(Continued)

OTHER PUBLICATIONS

International Search Report in international application No. PCT/CN2015/072811, dated May 12, 2015, 2 pgs.
(Continued)

*Primary Examiner* — Anh Ngoc M Nguyen
(74) *Attorney, Agent, or Firm* — Cooper Legal Group, LLC (57) ABSTRACT

Disclosed are an MBMS bearer-based method and system for reporting a congestion state in cluster communication and a storage medium. The method comprises: when user-side and/or control-side congestion or overload indication information reported by a network node of a multimedia broadcast multicast service (MBMS) bearer-based cluster service is received, a cluster service application server determines a target user equipment (UE) and a cluster service being affected, executes a corresponding policy, and mitigates impacts of congestion or overload on the target UE
(Continued)

receiving the cluster service; and, when resume indication information reported by the network node is received, the cluster service application server utilizes the restored network node to select a bearer mode for transmitting the cluster service. The technical solution of embodiments of the present invention mitigates the impacts of network congestion or overload on the cluster service, thus enhancing user experience with the service.

20 Claims, 6 Drawing Sheets

(51) Int. Cl.
  *H04W 28/14* (2009.01)
  *H04W 28/10* (2009.01)
  *H04L 12/18* (2006.01)
(52) U.S. Cl.
  CPC ....... *H04W 28/0252* (2013.01); *H04W 28/10* (2013.01); *H04W 28/14* (2013.01); *H04L 12/189* (2013.01)

(56) References Cited

U.S. PATENT DOCUMENTS

| | | | |
|---|---|---|---|
| 2010/0027541 A1 | 2/2010 | Eriksson | |
| 2010/0097958 A1* | 4/2010 | Yi | H04W 4/06 370/254 |
| 2012/0155282 A1* | 6/2012 | Dorenbosch | H04W 72/005 370/241.1 |
| 2014/0036676 A1 | 2/2014 | Purnadi | |

FOREIGN PATENT DOCUMENTS

| | | |
|---|---|---|
| CN | 104270725 A | 1/2015 |
| CN | 104301931 A | 1/2015 |
| WO | 2013066103 A1 | 5/2013 |

OTHER PUBLICATIONS

Written Opinion of the International Search Authority in international application No. PCT/CN2015/072811, dated May 12, 2015, 6 pgs.

"New Work Item: Group call eMBMS congestion management", Jun. 2014, GPP Draft; RP-141035, 3rd Generation Partnership Project (3GPP), 3GPP TSG RAN Meeting #64. Sophia Antipolis, France; Retrieved from the Internet: URL: http://www.3gpp.org/ftp/tsg_sa/WG2_Arch/TSGS2_104_Dulin/Docs/ [retrieved on Jul. 2, 2014], 6 pgs.

"Prevention of UE Establishing a Connection in a Congested MBMS Carrier", Nov. 2011, R2-116213, 3rd Generation Partnership Project, eGPP TSG-RAN WG2Meeting #76, San Francisco, USA; 3 pgs.

"Prevention of UE's Connection Establishment on Congested MBMS Freq", Nov. 2011, R2-116025, 3rd Generation Partnership Project (3GPP), 3GPP TSG RAN WG2 Meeting #76, San Francisco, USA; 2 pgs.

Supplementary European Search Report in European application No. 15827932.3, dated Oct. 5, 2017, 9 pgs.

* cited by examiner

MBMS BEARER-BASED METHOD AND SYSTEM FOR REPORTING CONGESTION STATE IN CLUSTER COMMUNICATION AND STORAGE MEDIUM

TECHNICAL FIELD

The disclosure relates to Multimedia Broadcast Multicast Service (MBMS) bearer-based group communication technology, and in particular to a method and system for reporting a congestion state in MBMS bearer-based group communication, and a storage medium.

BACKGROUND

A group communication system is a dedicated wireless communication system that is developed to meet users' demands for command and dispatch and applied in specific industries. In the group communication system, a large number of wireless users share a small number of wireless channels. With command and dispatch as main applications, the group communication system is a multi-purpose and highly efficient wireless communication system. The group communication system has a wide range of applications in fields such as government sectors, public safety, emergency communications, electricity, civil aviation, petrochemical industry and military affairs. The distinguishing feature between the group communication system and a public communication system lies in that the group communication system needs to have highly efficient command and dispatch performance, and requires its network to be highly reliable and secure.

Figure 1:
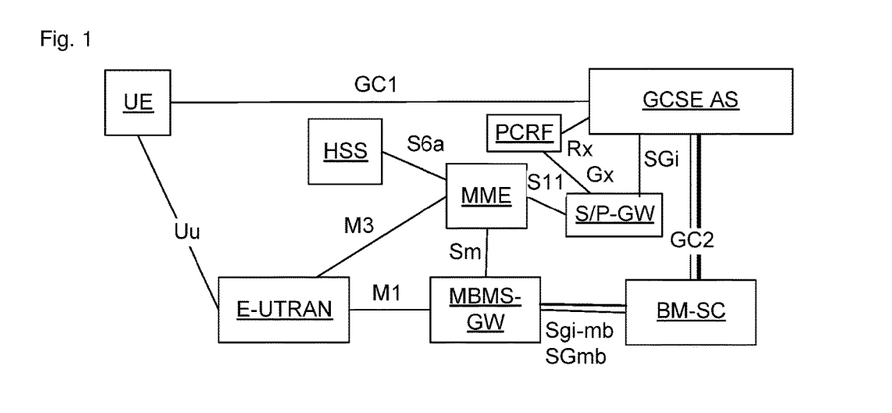
FIG. 1 is a diagram of the architecture of group communication system.

In 3rd Generation Partnership Project (3GPP) LTE, the group communication system is referred to Group Communication Service Enabler (GCSE). FIG. 1 shows the system architecture of an LTE GCSE.

Figure 2:
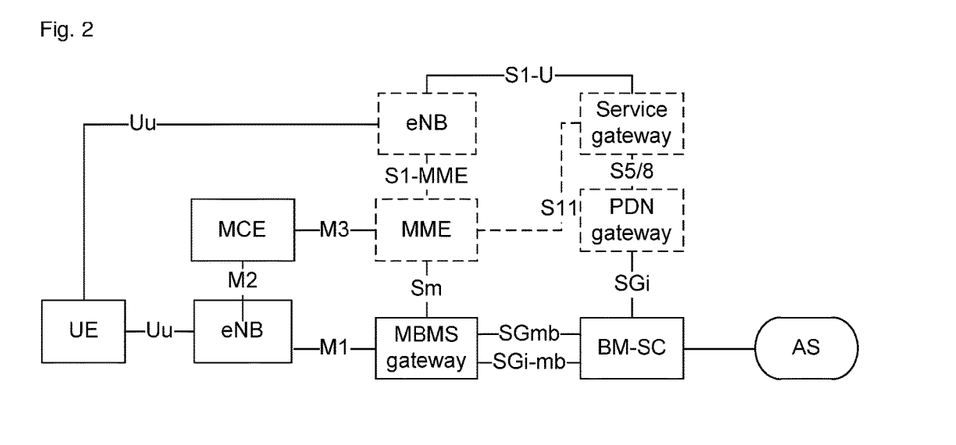
FIG. 2 is a diagram of the communication architecture of MBMS (Multimedia Broadcast Multicast Service)

In order to make efficient use of resources of a mobile network, the 3GPP proposes Multimedia Broadcast Multicast Service (MBMS). The service is a technology that transmitting data from a data source to multiple target mobile terminals, achieves sharing of resources of the network (including core network and access network), and improves the utilization ratio of the network resources (especially air interface resources). The MBMS defined by the 3GPP enables not only low-speed message-class multicast and broadcast of plaintext, but also broadcast and multicast of high-speed multimedia services, thus providing various abundant video, audio and multimedia services. This undoubtedly conforms to the development trends of future mobile data and provides better service prospects for the development of 3G. FIG. 2 shows a diagram of MBMS architecture in LTE.

At present, the industry is discussing the possibility of implementing group communication by employing MBMS technology. For a specific group communication UE, a required Group Communication Service (GCS) may be received in any one of the following two modes: multicast and unicast. The multicast mode refers to receiving the GCS through an MBMS bearer. In this case, the UE needs to have MBMS receiving capability In the research and practice of the prior art, it is found that the prior art has the following problems: when GCSs are transmitted through the MBMS bearers, simultaneous initiation of multiple GCSs may cause congestion or overload in the network. However, a GCS Application Server (GCS AS) is not aware of the congestion or overload in the network and cannot deal with the congestion or overload in time. Thereby, this causes the target UE fail to receive the required GCSs normally.

SUMMARY

To solve the above technical problems, embodiments of the disclosure provide a method and system for reporting a congestion state in Multimedia Broadcast Multicast Service (MBMS) bearer-based group communication and a storage medium, which can eliminate impact of congestion or overload on a Group Communication Service (GCS).

The technical solutions of embodiments of the disclosure are implemented as follows.

A method for reporting a congestion state in MBMS (Multimedia Broadcast Multicast Service) bearer-based group communication, including: upon reception of user plane and/or control plane congestion or overload indication information reported by a network node that transfers a Group Communication Service (GCS) based on an MBMS bearer, a Group Communication Service Application Server (GCS AS) determines affected target user equipment (UE) and affected GCS, and performs a strategy to reduce impact of congestion or overload on reception of the GCS by the target UE.

In an implementation, the method may further include: upon reception of recovery indication information reported by the network node, the GCS AS selects a bearing mode for sending a GCS. Herein, the recovery means that the network node detects an end of the congestion or overload.

In an implementation, the MBMS bearer may include a core network bearer and an air interface bearer, and the MBMS bearer is established before the GCS starts.

In an implementation, the network node may include at least one of: an evolved Node B (eNodeB), a Multi-cell/Multicast Coordination Entity (MCE), a Mobility Management Entity (MME), a MBMS Gateway (MBMS GW), and a Broadcast Multicast Service Center (BM-SC).

In an implementation, the congestion may include that control plane signalling and/or user plane load in the network reaches a predetermined threshold; and the overload may include that the control plane signalling and/or the user plane load in the network exceeds capability of the network node such that the network node is not capable of processing extra signalling and/or extra user plane load any more.

In an implementation, the congestion/overload indication information may include at least one of: a congestion/overload identifier, an MBMS Service Area Identifier (SAI), MBMS Temporary Mobile Group Identity (TMGI), a congestion/overload start/end identifier; herein the congestion/overload identifier is adapted to indicate whether congestion or overload occurs in a network; the SAI is adapted to indicate a service area affected by the congestion/overload; the TMGI is adapted to indicate an GCS affected by the congestion/overload.

In an implementation, the method may further include: the network node reports indication information indicating a congestion/overload start or end, to the GCS AS, when an congestion/overload start or end event occurs in the network node; or the network node reports indication information indicating the congestion/overload start or end, to the GCS AS, when the network node receives, from the GCS AS, a request to report congestion/overload indication.

In an implementation, the strategy may include: when the congestion occurs, a unicast bearer for the target UE is established, and the GCS is sent via the unicast bearer; and when the overload occurs, GCSs to be sent are queued and the queued GCSs are sent after the overload ends, or a GCS of high priority is made to pre-empt a resource of a current GCS to ensure sending of the GCS of high priority.

In an implementation, the affected GCS whose reception by the target UE is affected may include specific GCSs; herein the specific GCSs are services in which it is determined that congestion/overload occurs based on an Quality of Service (QoS) Class Identifier (QCI) and an Allocation Retention Priority (ARP) of the services; where the method may further include: the target UE's reception of ordinary MBMS services are affected when congestion or overload occurs.

In an implementation, the method may further include: the network node reports TMGIs of all services subjected to congestion/overload, to a network element between the network node and the GCS AS, when the specific GCSs have congestion/overload; the network element selects and sends TMGIs of the specific GCSs subjected to congestion/overload to the GCS AS; or the network node reports TMGIs of specific GCSs in a congestion/overload-affected service area indicated by an SAI, when the network node receives, from the GCS AS, a request to report the SAI indicating the congestion/overload-affected service area and its corresponding TMGI(s); or the network node reports TMGIs of all services in the congestion/overload-affected service area indicated by the SAI to the GCS AS, when the network node receives, from the GCS AS, a request to report an SAI indicating the congestion/overload-affected service area.

In an implementation, the method may further include: a triggering mode in which the network node is triggered to report related information to the GCS AS is any one of event triggering, GCS AS request triggering and a combination of the event triggering and the GCS AS request triggering; herein the event triggering means that, when a congestion/overload start/end event occurs in the network node, the network node reports the event to the GCS AS; the GCS AS request triggering means that the GCS AS sends, to the network node, a request to report, and then the network node that receives the request, reports to the GCS AS; the combination of the event triggering and the GCS AS request triggering means that the GCS AS sends, to the network node, a request to report, and then when a congestion/overload start/end event occurs in the network node, the network node that receives the request reports the congestion/overload start/end event to the GCS AS.

A system for reporting a congestion state in Multimedia Broadcast Multicast Service (MBMS) bearer-based group communication, the system comprising a Group Communication Service Application Server (GCS AS) and a network node, in which: the network node is arranged to: transfer a Group Communication Services (GCS) based on an MBMS bearer; send user plane and/or control plane congestion or overload indication information to the GCS AS, when user plane and/or control plane congestion or overload occurs; the GCS AS is arranged to: receive the user plane and/or control plane congestion or overload indication information; determine an affected target UE and GCS and perform a strategy to reduce impact of congestion or overload on reception of the GCS by the target UE.

In an implementation, the network node may be further arranged to send recovery indication information to the GCS AS, when the network node detects an end of the user plane and/or control plane congestion or overload; the GCS AS is further arranged to select a bearing mode for sending a GCS upon reception of the recovery indication information; herein the recovery means that the network node detects an end of the congestion or overload.

In an implementation, the MBMS bearer may include a core network bearer and an air interface bearer, and the MBMS bearer is established before the GCS starts.

In an implementation, the network node may include at least one of: an evolved Node B (eNodeB), a Multi-cell/Multicast Coordination Entity (MCE), a Mobility Management Entity (MME), a MBMS Gateway (MBMS GW), and a Broadcast Multicast Service Center (BM-SC).

In an implementation, the congestion includes that control plane signalling and/or user plane load in the network reaches a predetermined threshold; and the overload comprises that the control plane signalling and/or the user plane load in the network exceeds capability of the network node such that the network node is not capable of processing extra signalling and/or extra user plane load any more.

In an implementation, the congestion/overload indication information may include at least one of: a congestion/overload identifier, an MBMS service area identifier (SAI), MBMS Temporary Mobile Group Identity (TMGI), a congestion/overload start/end identifier; herein the congestion/overload identifier is adapted to indicate whether congestion or overload occurs in a network; the SAI is adapted to indicate a service area affected by the congestion/overload; the TMGI is adapted to indicate an GCS affected by the congestion/overload.

In an implementation, the network node may be further arranged to report indication information indicating a congestion/overload start or end, to the GCS AS, when an congestion/overload start or end event occurs in the network node; or the GCS AS sends, to the network node, a request to report a congestion/overload indication; the network node is further arranged to report, to the GCS AS, indication information indicating the congestion/overload start or end, when the network node receives the request to report a congestion/overload indication.

In an implementation, the strategy may include: when the congestion occurs, a unicast bearer is established for the target UE, and the GCS is sent via the unicast bearer; and when the overload occurs, GCSs to be sent are queued and the queued GCSs are sent after the overload ends, or a GCS of high priority is made to pre-empt the resource of the current GCS to ensure sending of the GCS of high priority.

In an implementation, the system may further include a network element between the network node and the GCS AS; herein the network node is further arranged to report TMGIs of all services subjected to congestion/overload, to the network element, when it is determined that the specific GCSs have congestion/overload; and the network element is arranged to select and send TMGIs of the specific GCSs subjected to congestion/overload, to the GCS AS.

In an implementation, the GCS AS may be further arranged to send, to the network node, a request to report an SAI indicating a congestion/overload-affected service area and its corresponding TMGI(s); the network node is further arranged to report the TMGIs of the specific GCSs in the congestion/overload-affected service area indicated by the SAI, to the GCS AS upon reception of the request.

In an implementation, the GCS AS is further arranged to send, to the network node, a request to report an SAI indicating a congestion/overload-affected service area; the network node is further arranged to report TMGIs of all services in the congestion/overload-affected service area indicated by the SAI to the GCS AS upon reception of the request.

In an implementation, a triggering mode in which the network node is triggered to report related information to the GCS AS may be any one of event triggering, GCS AS request triggering and a combination of the event triggering and the GCS AS request triggering; where the event triggering means that, when a congestion/overload start/end event occurs in the network node, the network node reports the event to the GCS AS; the GCS AS request triggering means that the GCS AS sends, to the network node, a request to report, and then the network node that receives the request reports to the GCS AS; the combination of the event triggering and the GCS AS request triggering means that the GCS AS sends, to the network node, a request to report, and then when a congestion/overload start/end event occurs in the network node, the network node that receives the request reports a congestion/overload start/end event to the GCS AS.

A storage medium storing a computer program arranged to perform any one of the methods for reporting a congestion state in MBMS bearer-based group communication.

In the embodiments of the disclosure, the 3GPP (3rd Generation Partnership Project) network node that adopts the MBMS bearer to send an GCS, report to, GCS AS, congestion or overload indication information, when the network node detects user plane and/or control plane congestion or overload. The GCS AS that has received the congestion or overload indication information determines an affected target UE and GCS and executes a corresponding strategy to reduce impacts of the congestion or the overload on reception of the GCS by the target UE. When the network node detects an end of the congestion or overload, the network node reports, to the GCS AS, the recovery indication information. The AS that receives the recovery indication information selects a bearing mode for sending the GCS. When congestion or overload occurs in an MBMS bearer, it can be guaranteed that all of the GCS AS systems provide services to all group members in the system, and group users acquire GCSs in time, thus reducing the impacts of congestion or overload on the GCS and enhancing user experience with the service.

DETAILED DESCRIPTION

To make the objects, advantages and technical solutions of the disclosure more apparent and clear, hereinafter the disclosure will be further described in details through embodiments and with reference to the drawings.

In the embodiments of the disclosure, unless otherwise specified, MBMS (Multimedia Broadcast Multicast Service) indicates evolved MBMS, namely, eMBMS. AS (Application Server) indicates GCS AS (Group Communication Service Application Server).

Figure 3:
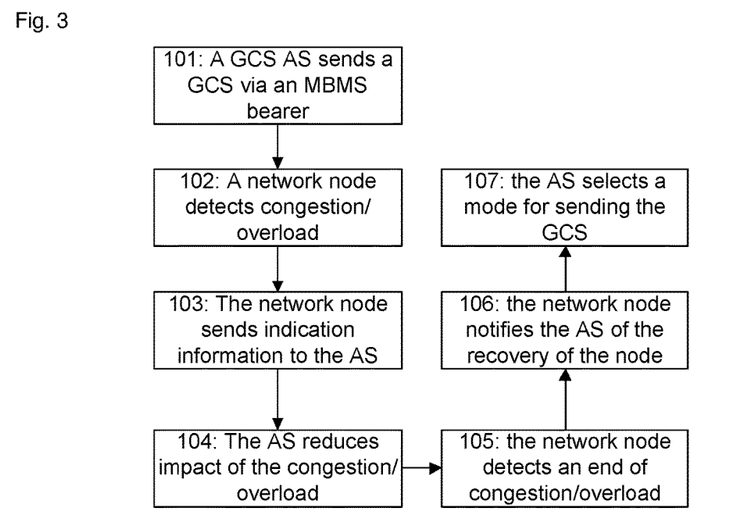
FIG. 3 is a flowchart of a method for reporting a congestion state in MBMS bearer-based group communication according to an embodiment of the disclosure.

As shown in FIG. 3, a method for reporting a congestion/overload state in MBMS bearer-based group communication according to an embodiment of the disclosure includes the following steps.

At Step 101, a GCS AS sends a Group Communication Service (GCS) via an MBMS bearer.

Before the Step 101 starts, a group communication UE first register in the GCS AS corresponding to the GCS. In this way, the GCS AS can know that how many UEs join a certain GCS.

The MBMS bearer has been pre-established before the GCS starts. According to the embodiment of the disclosure, the "pre-established" means that the MBMS bearer has been established in advance before a certain group communication is initiated.

In the embodiments of the disclosure, the following descriptions refer to the same concept: MBMS bearer, MBSFN bearer, multicast bearer and point-to-multipoint PTM bearer.

The MBMS bearer includes a core network bearer, namely, EPC (Evolved Packet Internet Core) bear and an air interface bearer. In the embodiments of the disclosure, MBMS air interface resources are arranged via RAN (Radio Access Network) network elements, such as a base station, and/or an MBMS MCE (Multi-cell/multicast Coordination Entity), and MBMS configuration information and group communication data are sent in an air interface.

It should be pointed out that the above GCS can also be ordinary MBMS. The ordinary MBMS can be differentiated from the GCS by different Quality of Service (QoS) Class Identifier (QCI) parameters. For the ordinary MBMS, the corresponding MBMS bearer needs no pre-establishment.

At Step 102, a network node detects congestion and/or overload.

The network node includes an eNodeB, an MCE, a Mobility Management Entity (MME), an MBMS Gateway (MBMS GW), or a Broadcast Multicast Service Center (BM-SC).

The congestion indicates that the control plane signalling and/or the user plane load in the network reaches a predetermined threshold, and the overload indicates that a control plane signalling and/or a user plane load in the network exceeds capacity of the network node, and thus the network node cannot process extra signalling and/or extra user plane load any more.

At Step 103, the network node sends the congestion/overload indication information of the network node to the AS.

The congestion/overload indication information includes at least one of the followings: a congestion/overload identifier, an MBMS SAI (Service Area Identifier), an MBMS TMGI (Temporary Mobile Group Identity), and a congestion/overload start/end identifier, wherein the congestion/overload identifier is used to indicate that network is congested or overloaded; the SAI is used to indicate service areas affected by the congestion/overload; and the TMGI is used to indicate the GCS affected by the congestion/overload.

The contents of the congestion/overload start/end can include at least one of the followings: start (indicated by 1 or true) and end (indicated by 0 or false).

The congestion/overload start/end, namely, congestion/overload start is equivalent to that the congestion/overload occurs currently, and congestion/overload end is equivalent to that the congestion/overload does not occur currently or the started congestion/overload has ended.

The node congestion indicates that control plane signalling and/or user plane data load in the network reaches a certain predetermined threshold.

The node overload indicates that a control plane signalling and/or a user plane load in the network exceeds capability of the network node, and thus the network node cannot process the extra control plane signalling and/or the extra user plane data load any more.

The contents of the information reporting MBMS congestion/overload are: assuming that C indicates congestion and that 0 indicates overload. For example:

{SA1:TMGI 1,TMGI2, TMGI3; C, true}
{SA2:TMGI5, TMGI6; O, false}
{SA3:TMGI10; C, false}

In the above example, the congestion occurs to TMGI 1, TMGI2 and TMGI3 in SA1; the overload of TMGI5 and TMGI6 in SA2 has ended; and the congestion of TMGI10 in SA3 has ended.

When the overload indication 0 is 1 (true), the congestion indication C may not be sent any more, or although the congestion indication C is sent, the UE can ignore the indication.

The congestion/overload service includes any one of an ordinary MBMS service and a specific group service. Considering that congestion/overload may occur in the certain group service (for example, PTT, Push To Talk), it is determined that the service with the congestion/overload is a specific GCS based on Quality of Service (QoS) information such as QoS Class Identifier (QCI) or Allocation Retention Priority (ARP), of the service. Since the eNB is not aware of the QoS information of the service, the eNB has two modes for reporting congestion/overload: 1) the eNB reports TMGIs of all services subjected to congestion/overload, to the MCE, and the MCE selects and reports TMGIs of specific services subjected to congestion/overload to the GCS AS, based on the TMGIs of the specific services (based on correspondence between an QCI/ARP and an TMGI);

2) The AS requests an SAI and TMGI of which a state is to be reported, and sends a request to the eNB via a path of AS->BM-SC->MBMS GW->MME->MCE->eNB. The eNB reports a state of an TMGI of a specific SAI, to the AS, via a path of eNB->MCE->MME->MBMS GW->BM-SC-AS.

In case that the request from the AS only includes an SAI, the eNB reports all TMGI states in the SAI.

A triggering type of the reporting may be any one of event triggering, AS request triggering and a combination thereof. The event triggering of the reporting means that, when a congestion/overload start/end event occurs in the network node, the network node reports the event to the AS. The AS request triggering means that the AS sends a request to a network node, and the network node that receives the request, reports node sate information to the AS. The combination of the event triggering and the AS request triggering means that the AS reports a request to a network node, the network node that receives the request, reports a congestion/overload start/end event to the AS, when the event occurs in the network node.

The fact that the congestion/overload start/end event occurs in the network node, means that, the congestion/overload is changed from a start state to an end state, or is changed from an end state to a start state. That is, when a state in which congestion/overload does not exist (equivalent to that last congestion/overload has ended) is changed into a state in which the congestion/overload begins (equivalent to that congestion/overload appears currently), the eNB should report. Furthermore, when the eNB detects that a changeover between the congestion state and the overload state, the eNB also should report.

That is, C=a congestion indication identified by {0, 1}. O=an overload indication identified by {0, 1}. The eNB should report as long as the identifier of C and/or O is changed.

In summary, in case that the state of start or end of the congestion/overload is not changed, the eNB has no need to report. In this way, the AS is always aware of the congestion/overload state of the MBMS.

At Step 104, the AS performs a strategy for suppressing influence of congestion/overload.

The AS first determines, according to the above congestion/overload indication information, the affected target UE and the TMGI of the GCS, then the AS determines, according to the congestion/overload indication information and a local strategy, the to-be-taken actions. For example, when the congestion occurs, establishing a unicast bearer for the target UE and sending the GCS via the unicast bearer; and when the overload occurs, the AS queues the GCS and sends the queued GCS after the overload ends or the AS uses the GCS of high priority to pre-empt the resource of the current GCS.

At Step 105, the network node detects an end of congestion/overload.

The end of the congestion/overload means that the network recovers to a normal state, for example, a network signalling and/or a user plane load is below a predetermined threshold.

At Step 106, the network node transmits recovery indication information to the AS.

The network node transmits the indication information via an existing flow. The recovery indication information includes at least one of a congestion/overload identifier, an MBMS SAI, an TMGI, a congestion/overload end identifier.

At Step 107, the AS selects a mode for sending the GCS to the UE.

The AS determines an affected target UE according to the above recovery indication information, and selects the proper mode to send the new GCS to the target UE. Fox example, continuing sending the GCS using the current MBMS bearer.

The technical solutions provided by embodiments of the disclosure will be further described hereinafter via specific examples of GCS procedures.

First Embodiment

Figure 4:
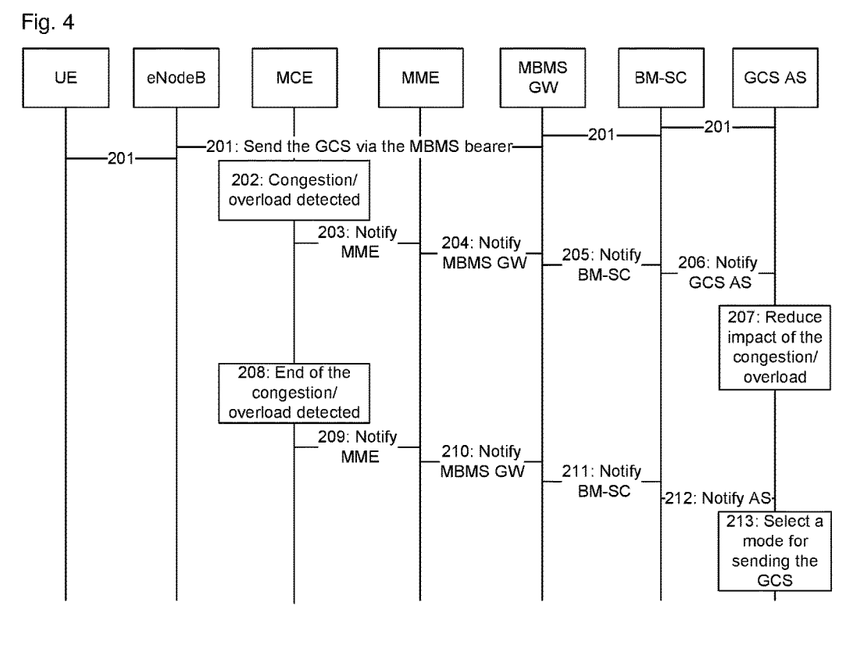
FIG. 4 is a flowchart of a method for reporting a congestion state in MBMS bearer-based group communication according to a first embodiment of the disclosure.

In the scene that the network node that detects congestion/overload is the MCE, as shown in FIG. 4, the method for reporting a congestion state in MBMS bearer-based group communication according to the embodiment includes the following steps.

At Step 201, the AS sends the GCS via the MBMS bearer.

The MBMS bearer of the GCS has been pre-established before the GCS starts.

At Step 202, the MCE detects congestion/overload.

The congestion/overload is control plane signalling congestion/overload.

At Step 203, the MCE sends the congestion/overload indication information to the MME.

The MCE sends the indication information to the MME via an M3 interface. The indication information can be achieved via the expansion of the current M3 interface signalling or the establishment of a new procedure of M3 interface signalling.

The indication information includes at least one of the followings: a congestion/overload identifier, an MBMS SAI, an MBMS TMGI, and a congestion/overload start/end identifier.

At Step 204, the MME sends the congestion/overload indication information to the MBMS GW.

The MME sends the congestion/overload indication information to the MBMS GW via a Sm interface. The indication information can be achieved via the expansion of current Sm interface signalling or the establishment of a new procedure of Sm interface signalling.

At Step 205, the MBMS GW sends the congestion/overload indication information to the BM-SC.

The MBMS GW sends the congestion/overload indication information to the BM-SC via a SGmb interface. The indication information can be achieved via the expansion of the current SGmb interface signalling or the establishment of a new procedure of SGmb interface signalling.

At Step 206, the BM-SC sends the congestion/overload indication information to the AS.

The BM-SC sends the congestion/overload indication information to the AS via an MB2 interface. The indication information can be achieved via the expansion of the current MB2 interface signalling or the establishment of a new procedure of MB2 interface signalling.

At Step 207, the AS takes actions to reduce impacts of the congestion/overload.

The AS first determines the affected target UE and GCS, and takes actions according to congestion and overload information. For example, when the congestion occurs, the AS sends the GCS by adopting the unicast bearer; and when the overload occurs, the AS queues the GCS and sends the queued GCS after the overload ends or uses the GCS of high priority pre-empt the resource of the current GCS.

At Step 208, the MCE detects an end of the congestion/overload.

At Step 209, the MCE sends the recovery indication information to the MME.

At Step 210, the MME sends the recovery indication information to the MBMS GW.

At Step 211, the MBMS GW sends the recovery indication information to the BM-SC.

At Step 212, the BM-SC sends the recovery indication information to the AS.

At Step 213, the AS selects the mode for sending the GCS to the target UE.

Second Embodiment

Figure 5:
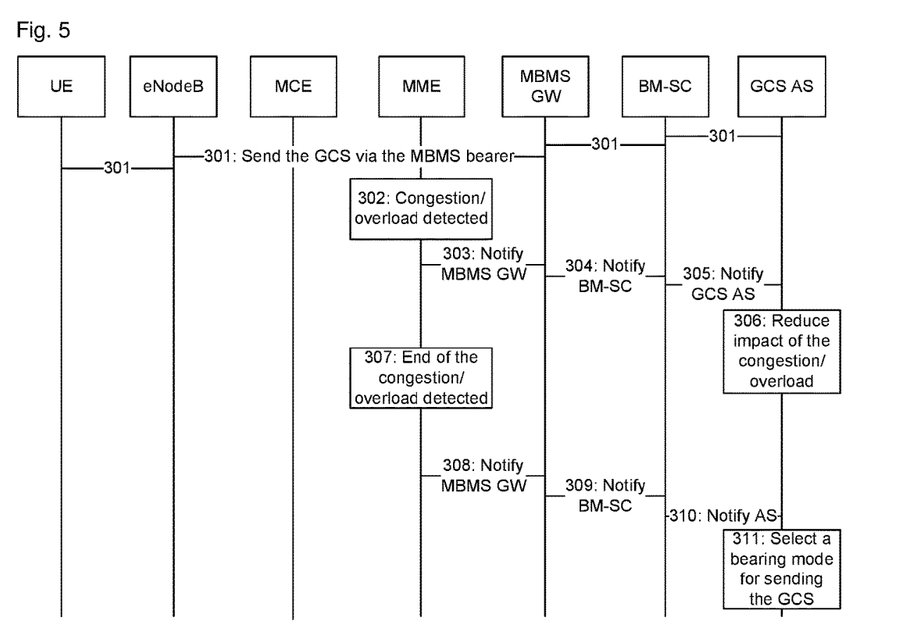
FIG. 5 is a flowchart of a method for reporting a congestion state in MBMS bearer-based group communication according to a second embodiment of the disclosure.

In the scene that the network node that detects congestion/overload is the MME, as shown in FIG. 5, the method for reporting a congestion state in MBMS bearer-based group communication according to the embodiment includes the following steps.

At Step 301, the AS sends the GCS via the MBMS bearer.

The step is identical to the Step 101, and will not be repeated.

At Step 302, the MME detects congestion/overload.

At Step 303, the MME sends the congestion/overload indication information to the MBMS GW.

The MME sends the congestion/overload indication information to the MBMS GW via the Sm interface.

At Step 304, the MBMS GW sends the congestion/overload indication information to the BM-SC.

The MBMS GW sends the congestion/overload indication information to the BM-SC via the SGmb interface.

At Step 305, the BM-SC sends the congestion/overload indication information to the AS.

At Step 306, the AS takes actions to reduce impacts of the congestion/overload.

At Step 307, the MME detects an end of the congestion/overload.

At Step 308, the MME sends the recovery indication information to the MBMS GW.

The MME sends the recovery indication information to the MBMS GW via the Sm interface.

At Step 309, the MBMS GW sends the recovery indication information to the BM-SC.

The MBMS GW sends the recovery indication information to the BM-SC via the SGmb interface.

At Step 310, the BM-SC sends the recovery indication information to the AS.

At Step 311, the AS selects the mode for sending the GCS to the UE.

Third Embodiment

Figure 6:
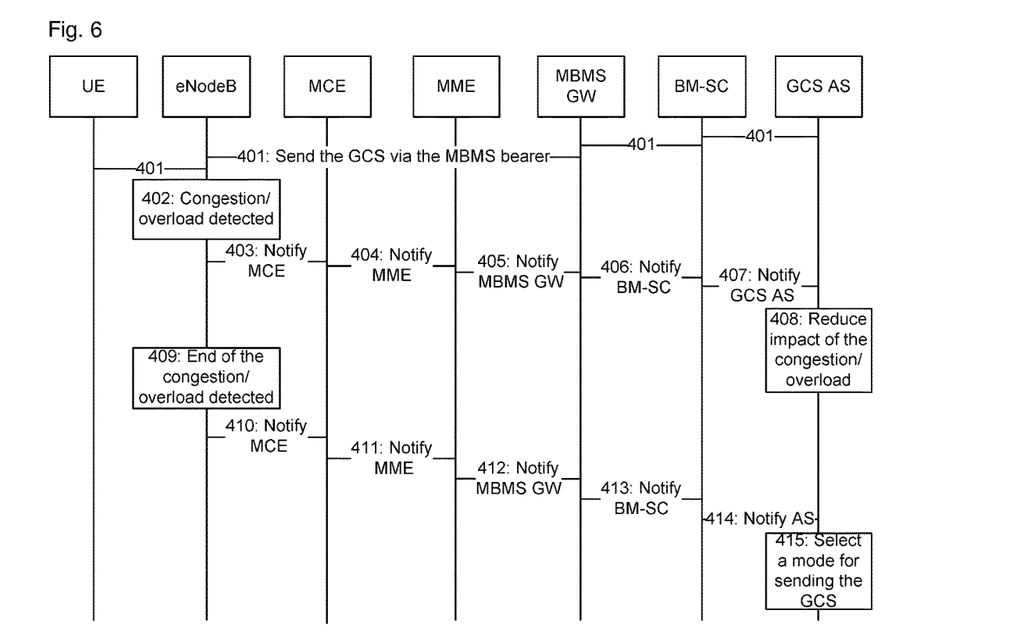
FIG. 6 is a flowchart of a method for reporting a congestion state in MBMS bearer-based group communication according to a third embodiment of the disclosure.

In the scene that the network node that detects congestion/overload is the eNodeB, as shown in FIG. 6, the method for reporting a congestion state in MBMS bearer-based group communication according to the embodiment includes the following steps.

At Step 401, the AS sends the GCS via the MBMS bearer.

At Step 402, the eNB detects congestion/overload.

The eNB detects congestion/overload in the user plane or control plane.

At Step 403, the eNB sends the congestion/overload indication information to the MCE.

The eNB sends the congestion/overload indication information to the MCE via the M2 interface.

The congestion/overload indication information includes at least one of the followings: a congestion/overload identifier, an MBMS SAI, and an MBMS TMG, wherein the congestion/overload identifier is used to indicate network congestion or overload, and the network congestion identifier can include multiple levels such as high level, middle level and low level; the SAI is used to indicate service areas affected by the congestion/overload; and the TMGI is used to indicate the GCS affected by the congestion/overload.

The contents of the congestion/overload identifier can include at least one of the followings: node congestion indication information and node overload indication information.

The node congestion indicates that the control plane signalling and/or the user plane load in the network reaches a certain predetermined threshold, and the node overload indicates that the network node cannot process the extra control plane signalling and/or the extra user plane load any more.

The eNB detects that a PMCH (Physical Multicast Channel) is congested or overloaded.

At Step 404, the MCE sends the congestion/overload indication information to the MME.

At Step 405, the MME sends the congestion/overload indication information to the MBMS GW.

At Step 406, the MBMS GW sends the congestion/overload indication information to the BM-SC.

At Step 407, the BM-SC sends the congestion/overload indication information to the AS.

At Step 408, the AS takes actions to reduce impacts of the congestion/overload.

At Step 409, the eNB detects an end of the congestion/overload.

At Step 410, the eNB sends the recovery indication information to the MCE.

At Step 411, the MCE sends the recovery indication information to the MME.

At Step 412, the MME sends the recovery indication information to the MBMS GW.

At Step 413, the MBMS GW sends the recovery indication information to the BM-SC.

At Step 414, the BM-SC sends the recovery indication information to the AS

At Step 415, the AS selects the mode for sending the GCS to the UE.

Fourth Embodiment

Figure 7:
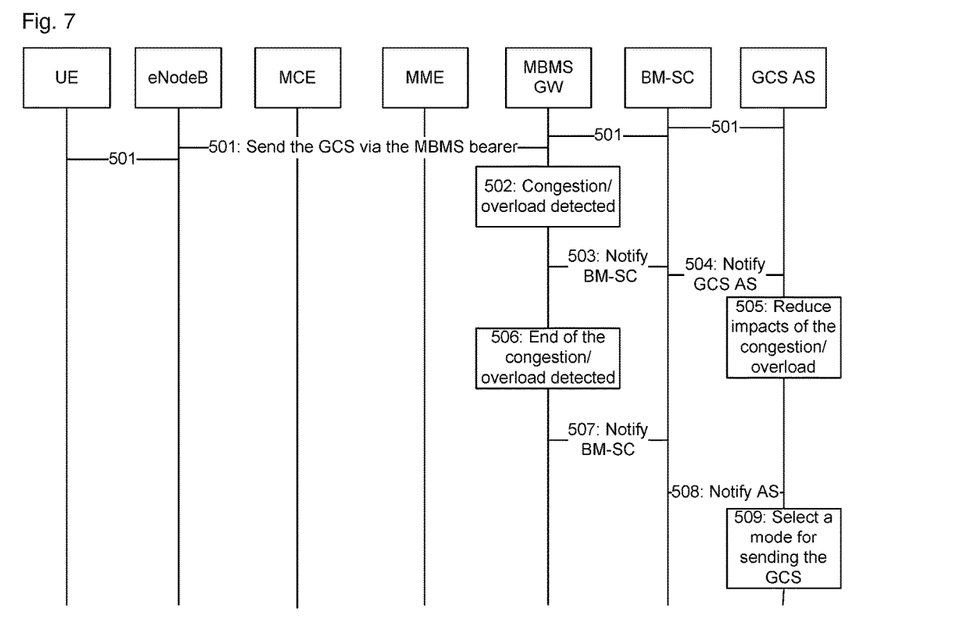
FIG. 7 is a flowchart of a method for reporting a congestion state in MBMS bearer-based group communication according to a fourth embodiment of the disclosure.

In the scene that the network node that detects congestion/overload is the MBMS-GW, as shown in FIG. 7, the method for reporting a congestion state in MBMS bearer-based group communication according to the embodiment includes the following steps.

At Step 501, the AS sends the GCS via the MBMS bearer.

The step is exactly identical to the Step 101, and will not be repeated.

At Step 502, the MBMS GW detects congestion/overload.

The congestion/overload is congestion/overload in control plane and/or user plane.

At Step 503, the MBMS GW sends the congestion/overload indication information to the BM-SC.

At Step 504, the BM-SC sends the congestion/overload indication information to the AS.

At Step 505, the AS takes actions to reduce impacts of the congestion/overload.

At Step 506, the MBMS-GW detects an end of the congestion/overload.

At Step 507, the MBMS GW sends the recovery indication information to the BM-SC.

At Step 508, the BM-SC sends the recovery indication information to the AS.

At Step 509, the AS selects the mode for sending the GCS to the UE.

Fifth Embodiment

Figure 8:
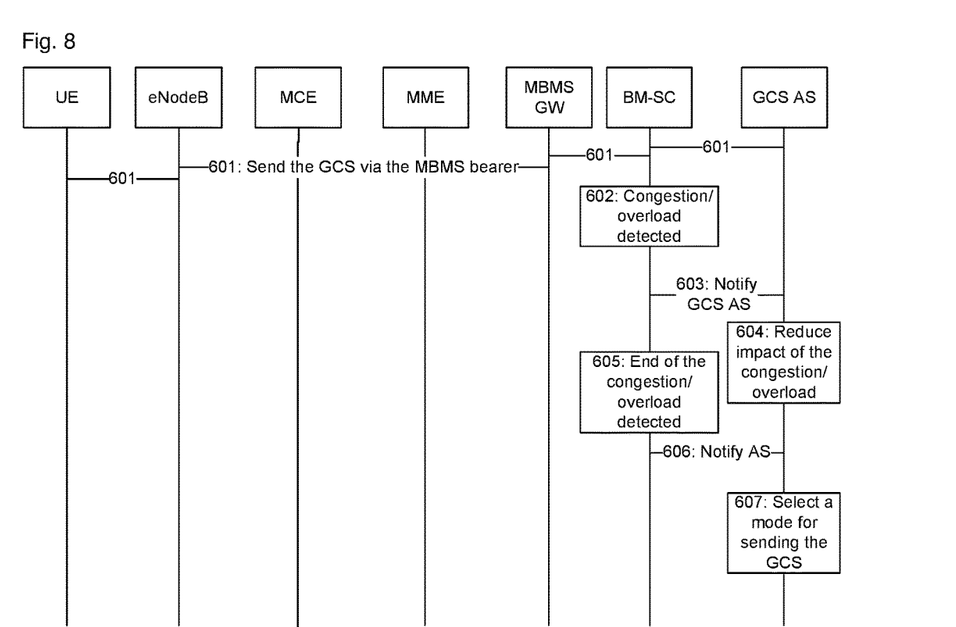
FIG. 8 is a flowchart of a method for reporting a congestion state in MBMS bearer-based group communication according to a fifth embodiment of the disclosure.

In the scene that the network node that detects congestion/overload is the BM-SC, as shown in FIG. 8, the method for reporting a congestion state in MBMS bearer-based group communication according to the embodiment includes the following steps.

At Step 601, the AS sends the GCS via the MBMS bearer.

The step is identical to the Step 101, and will not be repeated.

At Step 602, the BM-SC detects congestion/overload.

The congestion/overload is the congestion/overload of the control plane and/or the user plane.

At Step 603, the BM-SC sends the congestion/overload indication information to the AS.

At Step 604, the AS takes actions to reduce impacts of the congestion/overload.

At Step 605, the BM-SC sends the recovery indication information to the AS.

At Step 606, the BM-SC sends the recovery indication information to the AS.

At Step 607, the AS selects the mode for sending the GCS to the UE.

Embodiment 6

Figure 9:
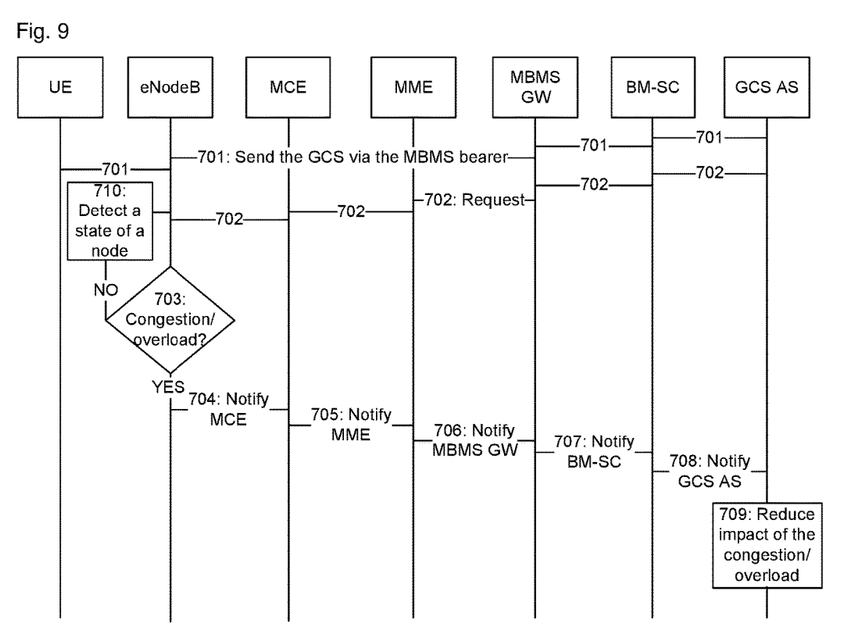
FIG. 9 is a flowchart of a method for reporting a congestion state in MBMS bearer-based group communication according to embodiment 6 of the disclosure.

In the scene that the AS requests the eNB to report congestion/overload, as shown in FIG. 9, the method for reporting a congestion state in MBMS bearer-based group communication according to the embodiment includes the following steps.

At Step 701, the AS sends the GCS via the MBMS bearer.

The step is identical to the Step 101, and will not be repeated.

At Step 702, the AS requests the eNB to report congestion/overload information.

The AS request the eNB to report the congestion/overload information via a path of AS->BM-SC->MBMS GW->MME->MCE->eNB.

The request from the AS includes one or more of the following contents: one or more SAIs, one or more TMGIs (Temporary Mobile Group Identities) in each SAI, congestion indication and overload indication.

When the request includes one or more SAIs but does not include one or more TMGIs corresponding to each SAI, the network node needs to report congestion/overload indication of all TMGIs borne by the SAI.

When the request includes one or more SAIs, and also includes one or more TMGIs corresponding to each SAI, the network node needs to report the congestion/overload indication of the TMGIs indicated by the SAI.

When the request includes the congestion indication, the overload indication, or the congestion/overload indication, the network node needs to report all the TMGIs to which congestion occurs (start) or overload occurs (start).

The congestion/overload is congestion/overload of control plane signalling and/or user plane data.

At Step 703, the eNB judges whether congestion/overload occurs. If yes, Step 704 is performed; otherwise, Step 710 is performed.

The eNB judges whether congestion/overload of the user plane data occurs based on a state of the PMCH, or judges whether congestion/overload of the control plane signalling occurs based on an air interface signalling.

At Step 704, the eNB sends the congestion/overload indication information to the MCE.

The eNB has congestion/overload, and then sends the congestion/overload indication information to the MCE via the M2 interface.

At Step 705, the MCE sends the congestion/overload indication information to the MME.

At Step 706, the MME sends the congestion/overload indication information to the MBMS GW.

At Step 707, the MBMS GW sends the congestion/overload indication information to the BM-SC.

At Step 708, the BM-SC sends the congestion/overload indication information to the AS.

At Step 709, the AS takes actions to reduce impacts of the congestion/overload.

At Step 710, the eNB detects a state of the node, and then turning to the Step 703.

When the eNB has no congestion/overload, the eNB will not send indication information to the AS and continues to detect the state of the node, turning to the Step 703 to judge whether congestion/overload occurs.

The fact that the congestion/overload start/end event occurs in the network node, means that, the congestion/overload is changed from a start state to an end state, or is changed from an end state to a start state. That is, when a state in which congestion/overload does not exist (equivalent to that last congestion/overload has ended) is changed into a state in which the congestion/overload starts (equivalent to that congestion/overload appears currently), the eNB should report. Furthermore, when the eNB detects that a changeover between the congestion state and the overload state, the eNB also should report.

That is, C=a congestion indication identified by {0, 1}. O=an overload indication identified by {0, 1}. The eNB should report as long as the identifier of C and/or O is changed. The embodiments of the disclosure further describes a system for reporting a congestion state in MBMS bearer-based group communication, and the system includes a Group Communication Service Application Server (GCS AS) and a network node, wherein the network node is arranged to transfer the GCS based on the MBMS bearer; and when congestion/overload occurs in the user plane and/or control plane, sends user plane and/or control plane congestion or overload indication information to the GCS AS;

the GCS AS is arranged to receive the user plane and/or control plane congestion or overload indication information, determine an affected target UE and GCS, and perform a corresponding strategy to reduce impacts of congestion or overload on reception of the GCS by the target UE. Wherein the network node is further arranged to send recovery indication information to the GCS AS, when an end of the user plane and/or control plane congestion or overload is detected;

the GCS AS is further arranged to select a bearing mode for sending the GCS using the recovered network node, when the recovery indication information is received;

The recovery means that the network node detects an end of the congestion or overload.

The MBMS bearer includes a core network bearer and an air interface bearer, and the MBMS bearer is established before the GCS starts.

The network node includes at least one of the followings: a base station, an MCE, an MME, an MBMS GW, and a BM-SC.

The congestion includes that the control plane signalling and/or the user plane load in the network reaches a predetermined threshold; and the overload includes that the control plane signalling and/or the user plane load in the network exceeds capability of the network node, and that the network node is not capable of processing extra signalling and/or extra user plane load any more.

The congestion/overload indication information includes at least one of the follows;

an congestion/overload identifier, an MBMS SAI, an MBMS TMGI, a congestion/overload start identifier;

where the congestion/overload identifier is used to indicate whether congestion or overload occurs in the network; the SAI is used to indicate a service area affected by the congestion/overload; and the TMGI is used to indicate an GCS affected by the congestion/overload.

Where the network node is further arranged to report an indication information indicating an start or end of the congestion/overload to the GCS AS, when an congestion/overload start or end event occurs;

or, the GCS AS reports a request of congestion/overload indication, to the network node; the network node is further arranged to report indication information of the congestion/overload start or end, to the GCS AS.

Wherein, the strategy includes:

when the congestion occurs, establishing a unicast bearer for the target UE, and sending the GCS via the unicast bearer; and when the overload occurs, queuing the GCS and sending the queued GCS after the overload ends, or making the GCS of high priority pre-empt the resource of the current GCS to ensure the sending of the GCS of high priority.

According to the embodiment of the disclosure, GCSs affecting receiving of the target UE include specific GCSs.

The specific GCSs is a service in which it is determined that congestion/overload occurs according to the QCI or the ARP of the service.

When the congestion or overload occurs, the target UE's reception of ordinary MBMS services is affected.

The system further includes a network element between the network node and the GCS AS.

The network node is further arranged to when the specific GCSs have congestion/overload, report TMGIs of all services to the network element. The network element is arranged to select the TMGIs of the specific GCSs in which congestion/overload occurs and send the TMGIs to the GCS AS.

The GCS AS is further arranged to send, to the network element, a request to report an SAI indicating a congestion/overload-affected service area and its corresponding TMGIs.

The network node, is further arranged to, after the request is received, report, to the GCS AS, TMGIs of the specific GCSs in the congestion/overload-affected service area indicated by the SAI.

The GCS AS is further arranged to report, to the network node, a request to report an SAI indicating a congestion/overload-affected service area.

The network node is further arranged to report, to the GCS AS, TMGIs of all services in the congestion/overload-affected service area indicated by the SAI, after the network receives the request.

A triggering type in which the network node reports related information to the GCS AS may be any one of event triggering, GCS AS request triggering and a combination thereof.

The event triggering means that, when a congestion/overload start/end event occurs in the network node, the network node reports the event to the GCS AS.

The GCS AS request triggering means that the GCS AS sends a request to a network node, and the network node that receives the request, reports to the GCS AS.

The combination of the event triggering and the GCS AS request triggering means that the GCS AS reports a request to a network node, and the network node that receives the request, reports a congestion/overload start/end event to the GCS AS, when the event occurs in the network node.

Those skilled in the art should recognize that the system for reporting a congestion state in MBMS bearer-based group communication is set to achieve the foregoing method for reporting a congestion state in MBMS bearer-based group communication, and that the functions and structures of related network elements can be recognized with reference to the description in the foregoing method embodiments.

Figure 10:
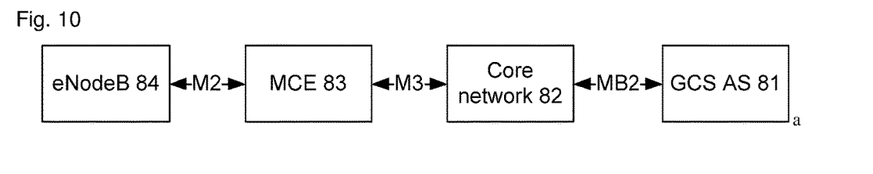
FIG. 10 is a structural diagram of a system for reporting a congestion state in MBMS bearer-based group communication according to an embodiment of the disclosure.

As a specific implementation, as shown in FIG. 10, the system for reporting a congestion state in MBMS bearer-based group communication according to an embodiment of the disclosure includes a GCS AS 81, a core network 82, an MCE 83 and an eNB 84.

The GCS AS 81 is arranged to receive congestion/overload and recovery indication information, conduct, according to the indication information, the processing, and select the mode for sending the GCS; and report related indication information of the congestion/overload to a related network element of a wireless access network.

The core network 82 is arranged to detect a congestion/overload state, and send the state indication information to the AS 81. The core network 82 is arranged to receive the related indication information of the congestion/overload sent by the related network element of the wireless access network. The core network 82 includes network nodes such as an BM-SC, an MBMS GW, an MME.

The MCE 83 is arranged to detect a congestion/overload state, receive the congestion/overload indication information sent by an eNB 84, and send the congestion/overload information to the AS 81 via the core network 82.

The eNB 84 is arranged to detect the congestion/overload state, receive the indication information from the MCE 83, and send the congestion/overload indication information to the AS 81 via the MCE 83 and the core network 82.

The embodiments of the disclosure further describe a storage medium, in which computer programs are stored. The computer programs are arranged to execute the foregoing method for reporting a congestion state in MBMS bearer-based group communication.

The technical solutions described in the embodiments of the disclosure can be combined with each other in the case of no conflict.

It should be recognized that the method and intelligent device disclosed in the embodiments provided by the disclosure can be achieved through other modes. The above device embodiments are only for illustration, for example, the division of the unit is just the division of logical functions, and other division modes can be used in actual realization. For example, multiple units and assemblies can be combined or can be integrated into another system, or some characteristics can be ignored or may not be executed. Furthermore, the mutual coupling among each part, direct coupling, or communication connection shown or described can be indirect coupling or communication connection via some interfaces, devices or units, and can be electrical, mechanical or other form.

The above units described as separation members may be or may not be physically separated. The members shown as units may be or may not be physical units, may be located in a place, or may be distributed on multiple network units. Partial or all units can be selected according to actual needs to achieve the purposes of the embodiments.

Furthermore, all function units in each embodiment of the disclosure can be integrated into a processing unit and also can be taken as one unit. In addition, two or more units can be integrated into a unit. The above integrated units can be achieved by means of hardware, and can also be achieved by means of the combination hardware and software functional units.

The above description is only the embodiments of the disclosure, and is not intended to limit the scope of protection of the disclosure. Modifications and substitutions within the technical scope disclosed by the disclosure easily occurring to anyone of those skilled in the art should fall within the scope of protection of the present invention.

INDUSTRIAL APPLICABILITY

When congestion or overload occurs in an MBMS bearer, it can be guaranteed that all of the GCS AS systems provide services to all group members in the system, and group users acquire GCSs in time, thus reducing the impacts of congestion or overload on the GCS and enhancing user experience with the service.

What is claimed is:

1. A method for reporting a congestion state in Multimedia Broadcast Multicast Service (MBMS) bearer-based group communication, comprising:
   upon reception of user plane and/or control plane congestion or overload indication information reported by a network node that transfers a Group Communication Service (GCS) based on an MBMS bearer, determining, by a Group Communication Service Application Server (GCS AS), affected target user equipment (UE) and affected GCS, and performing a strategy to reduce impact of congestion or overload on reception of the GCS by the target UE.

2. The method according to claim 1, further comprising:
   upon reception of recovery indication information reported by the network node, selecting, by the GCS AS, a bearing mode for sending the GCS,
   wherein the recovery means that the network node detects an end of the congestion or overload.

3. The method according to claim 1, wherein the MBMS bearer comprises a core network bearer and an air interface bearer, and
   the MBMS bearer is established before the GCS starts.

4. The method according to claim 1, wherein the network node comprises at least one of:
   an evolved Node B (eNodeB), a Multi-cell/Multicast Coordination Entity (MCE), a Mobility Management Entity (MME), a MBMS Gateway (MBMS GW), or a Broadcast Multicast Service Center (BM-SC).

5. The method according to claim 1, wherein the congestion comprises that control plane signalling and/or user plane load in a network reaches a predetermined threshold; and
   the overload comprises that the control plane signalling and/or the user plane load in the network exceeds capability of the network node such that the network node is not capable of processing extra signalling and/or extra user plane load any more.

6. The method according to claim 1, wherein the congestion/overload indication information comprises at least one of:
   a congestion/overload identifier, an MBMS Service Area Identifier (SAI), MBMS Temporary Mobile Group Identity (TMGI), or a congestion/overload start/end identifier;
   wherein the congestion/overload identifier indicates whether congestion or overload is occurring in a network; the SAI indicates a service area affected by the congestion/overload; the TMGI indicates the GCS affected by the congestion/overload.

7. The method according to claim 6, further comprising:
   reporting, by the network node, indication information indicating a congestion/overload start or end, to the GCS AS, when a congestion/overload start or end event occurs in the network node; or
   reporting, by the network node, indication information indicating the congestion/overload start or end, to the GCS AS, when the network node receives, from the GCS AS, a request to report congestion/overload indication.

8. The method according to claim 1, wherein the strategy comprises:

when the congestion occurs, establishing a unicast bearer for the target UE, and sending the GCS via the unicast bearer; and when the overload occurs, queuing GCSs to be sent and sending the queued GCSs after the overload ends, or making a GCS of high priority pre-empt a resource of a current GCS to ensure sending of the GCS of high priority.

9. The method according to claim 1, wherein the affected GCS whose reception by the target UE is affected comprises specific GCSs;

wherein the specific GCSs are services in which it is determined that congestion/overload occurs based on a Quality of Service (QoS) Class Identifier (QCI) and an Allocation Retention Priority (ARP) of the services;

the method further comprises:

affecting the target UE's reception of ordinary MBMS services, when congestion or overload occurs.

10. The method according to claim 9, further comprising:

reporting, by the network node, Temporary Mobile Group Identities (TMGIs) of all services subjected to congestion/overload, to a network element between the network node and the GCS AS, when it is determined that the specific GCSs have congestion/overload; selecting and sending, by the network element, TMGIs of the specific GCSs subjected to congestion/overload, to the GCS AS; or reporting, by the network node, TMGIs of specific GCSs in a congestion/overload-affected service area indicated by an SAI, when the network node receives, from the GCS AS, a request to report the SAI indicating the congestion/overload-affected service area and corresponding TMGI(s) of the specific GCSs in the congestion/overload-affected service area; or reporting, by the network node, TMGIs of all services in the congestion/overload-affected service area indicated by the SAI to the GCS AS, when the network node receives, from the GCS AS, a request to report the SAI indicating the congestion/overload-affected service area.

11. The method according to claim 1, wherein a triggering mode in which the network node is triggered to report related information to the GCS AS is any one of event triggering, GCS AS request triggering or a combination of the event triggering and the GCS AS request triggering;

wherein the event triggering means that, when a congestion/overload start/end event occurs in the network node, the network node reports the event to the GCS AS;

the GCS AS request triggering means that the GCS AS sends, to the network node, a request to report, and then the network node that receives the request reports to the GCS AS;

the combination of the event triggering and the GCS AS request triggering means that the GCS AS sends, to the network node, a request to report, and then when a congestion/overload start/end event occurs in the network node, the network node that receives the request reports the congestion/overload start/end event to the GCS AS.

12. A system for reporting a congestion state in Multimedia Broadcast Multicast Service (MBMS) bearer-based group communication, the system comprising a Group Communication Service Application Server (GCS AS) and a network node, wherein the network node is arranged to: transfer a Group Communication Services (GCS) based on an MBMS bearer; send user plane and/or control plane congestion or overload indication information to the GCS AS, when user plane and/or control plane congestion or overload occurs;

the GCS AS is arranged to: receive the user plane and/or control plane congestion or overload indication information; determine an affected target user equipment (UE) and GCS and perform a strategy to reduce impact of congestion or overload on reception of the GCS by the target UE.

13. The system according to claim 12, wherein the network node is further arranged to send recovery indication information to the GCS AS upon detection of an end of the user plane and/or control plane congestion or overload;

the GCS AS is further arranged to select a bearing mode for sending the GCS upon reception of the recovery indication information;

wherein the recovery means that the network node detects an end of the congestion or overload.

14. The system according to claim 12, wherein the MBMS bearer comprises a core network bearer and an air interface bearer;

the MBMS bearer is established before the GCS starts;

the network node comprises at least one of: an evolved Node B (eNodeB), a Multi-cell/Multicast Coordination Entity (MCE), a Mobility Management Entity (MME), a MBMS Gateway (MBMS GW), or a Broadcast Multicast Service Center (BM-SC);

the congestion comprises that control plane signalling and/or user plane load in a network reaches a predetermined threshold; and the overload comprises that the control plane signalling and/or the user plane load in the network exceeds capability of the network node such that the network node is not capable of processing extra signalling and/or extra user plane load any more.

15. The system according to claim 12, wherein the congestion/overload indication information comprises at least one of:

a congestion/overload identifier, an MBMS service area identifier (SAI), MBMS Temporary Mobile Group Identity (TMGI), or a congestion/overload start/end identifier;

wherein the congestion/overload identifier indicates whether congestion or overload is occurring in a network; the SAI indicates a service area affected by the congestion/overload; the TMGI indicates the GCS affected by the congestion/overload, wherein the network node is further arranged to report indication information indicating a congestion/overload start or end, to the GCS AS, when a congestion/overload start or end event occurs in the network node; or the GCS AS sends, to the network node, a request to report a congestion/overload indication; the network node is further arranged to report, to the GCS AS, indication information indicating the congestion/overload start or end, when the network node receives the request to report a congestion/overload indication.

16. The system according to claim 12, wherein the strategy comprises:

when the congestion occurs, establishing a unicast bearer for the target UE, and sending the GCS via the unicast bearer; and when the overload occurs, queuing GCSs to be sent and sending the queued GCS after the overload ends, or making a GCS of high priority pre-empt a resource of a current GCS to ensure sending of the GCS of high priority.

17. The system according to claim 12, further comprising a network element between the network node and the GCS AS;
wherein the network node is further arranged to report Temporary Mobile Group Identities (TMGIs) of all services subjected to congestion/overload, to the network element, when it is determined that specific GCSs have congestion/overload; and the network element is arranged to select and send TMGIs of the specific GCSs subjected to congestion/overload, to the GCS AS.

18. The system according to claim 12, wherein when the GCS AS is further arranged to send, to the network node, a request to report an SAI indicating a congestion/overload-affected service area and corresponding Temporary Mobile Group Identity (TMGI) of specific GCSs in the congestion/overload-affected service area, the network node is further arranged to report the TMGIs of the specific GCSs in the congestion/overload-affected service area indicated by the SAI, to the GCS AS upon reception of the request;
when the GCS AS is further arranged to send, to the network node, a request to report an SAI indicating a congestion/overload-affected service area, the network node is further arranged to report TMGIs of all services in the congestion/overload-affected service area indicated by the SAI to the GCS AS upon reception of the request.

19. The system according to claim 12, wherein a triggering mode in which the network node is triggered to report related information to the GCS AS is any one of event triggering, GCS AS request triggering a combination of the event triggering and the GCS AS request triggering;
wherein the event triggering means that, when a congestion/overload start/end event occurs in the network node, the network node reports the event to the GCS AS;
the GCS AS request triggering means that the GCS AS sends, to the network node, a request to report, and then the network node that receives the request reports to the GCS AS;
the combination of the event triggering and the GCS AS request triggering means that the GCS AS sends, to the network node, a request to report, and then when a congestion/overload start/end event occurs in the network node, the network node that receives the request reports the congestion/overload start/end event to the GCS AS.

20. A non-transitory storage medium readable by a processor and having recorded thereon a computer program including instructions for performing a method for reporting a congestion state in Multimedia Broadcast Multicast Service (MBMS) bearer-based group communication, the method comprising:
upon reception of user plane and/or control plane congestion or overload indication information reported by a network node that transfers a Group Communication Service (GCS) based on an MBMS bearer, determining, by a Group Communication Service Application Server (GCS AS), affected target user equipment (UE) and affected GCS, and performing a strategy to reduce impact of congestion or overload on reception of the GCS by the target UE.

* * * * *